United States Patent [19]

Ishida et al.

[11] Patent Number: 5,434,490
[45] Date of Patent: Jul. 18, 1995

[54] ARTICLE TRANSPORT SYSTEM

[75] Inventors: Hideo Ishida, Kasugai; Takashi Tanaka, Komaki; Haruhiro Watanabe, Kasugai, all of Japan

[73] Assignee: Daifuku Co., Ltd., Japan

[21] Appl. No.: 98,956

[22] Filed: Jul. 29, 1993

[30] Foreign Application Priority Data

Jul. 31, 1992 [JP] Japan .................. 4-204663
Oct. 1, 1992 [JP] Japan .................. 4-263410

[51] Int. Cl.$^6$ .......................... B62D 1/28; B65G 1/06
[52] U.S. Cl. ....................... 318/587; 318/580; 318/16; 180/168; 414/279
[58] Field of Search .............. 318/580, 581, 587, 16; 180/167, 168, 169; 364/424.01, 424.02, 478; 414/279, 281, 282; 901/1, 46, 47

[56] References Cited

U.S. PATENT DOCUMENTS

| | | | |
|---|---|---|---|
| 3,722,426 | 3/1973 | Beer . | |
| 4,309,758 | 1/1982 | Halsall et al. | 364/424 |
| 4,996,468 | 2/1991 | Field et al. | 318/587 |
| 5,008,604 | 4/1991 | Dammeyer et al. | 318/587 |
| 5,034,673 | 7/1991 | Shoji et al. | 318/587 |
| 5,211,523 | 5/1993 | Galan et al. | 414/282 |
| 5,228,820 | 7/1993 | Stansfield et al. | 414/278 |

Primary Examiner—Bentsu Ro
Attorney, Agent, or Firm—Webb Ziesenheim Bruening Logsdon Orkin & Hanson

[57] ABSTRACT

An article transport system includes a plurality of article loading and unloading stations, at least one carriage for running between the stations to transport articles therebetween, and a base station installed on the ground to provide the carriage with running instructions at an article transport request received from one of the stations. Each of the base station, loading and unloading stations and carriage includes a radio communication unit. Article transport requests and running instructions are transmitted by radio communication.

11 Claims, 5 Drawing Sheets

ARTICLE TRANSPORT SYSTEM

BACKGROUND OF THE INVENTION

1. Field of the Invention

This invention relates to article transport systems, and more particularly to an article transport system including a plurality of stations for loading and unloading articles, a carriage for transporting articles between the stations, and a control device installed on the ground to control running of the carriage.

2. Description of the Related Art

In a conventional article transport system of the type noted above, the plurality of stations and the control device on the ground are interconnected through wires. Article transport requests are made from the stations through the wires.

The stations and carriage have optical communication units, respectively, to communicate with each other. When the carriage stands still at one of the stations, the control device on the ground transmits running instructions to the carriage through the optical communication units of the station and carriage and the wire extending between this station and control device.

In an article transport system including a home position for the carriage to stand by, the home position is wired to the control device on the ground, and the home position and carriage both have optical communication units to communicate with each other. When the carriage stands still in the home position, the control device on the ground transmits running instructions to the carriage through the wire and optical communication units.

Where the stations are used for transport of varied articles to and from assembly lines, for example, alterations to the assembly lines may require additional stations to be installed or existing stations to be relocated.

In the conventional systems, the wiring or piping must be provided between each station and the control device on the ground. This makes addition or relocation of the stations difficult. The conventional systems have room for improvement in this respect.

SUMMARY OF THE INVENTION

The present invention has been made having regard to the state of the art noted above, and its object is to provide an article transport system which facilitates addition and relocation of article loading and unloading stations.

The above object is fulfilled, according to the present invention, by an article transport system comprising a plurality of article loading and unloading stations, a carriage for running between the stations, and a ground control device for instructing the carriage to run between the stations to transport an article therebetween at an article transport request received from one of the stations, wherein each of the control device, stations and carriage includes a radio communication unit, the one of the stations transmitting the article transport request to the control device, and the control device instructing the carriage to run, both by radio communication.

With the above construction, an article transport request may be transmitted from one of the stations to the control device through the radio communication units provided for the station and the control device. Further, running instructions may be transmitted from the control device to the carriage through the radio communication units provided for the control device and the carriage.

This article transport system does not require wiring or piping to be provided between each station and the control device on the ground for transmitting an article transport request from the station to the control device, and transmitting running instructions from the control device to the carriage. This facilitates addition and relocation of stations.

Where the article transport system includes a home position, no wiring or piping is required between the home position and control device for transmitting running instructions from the control device to the carriage. This facilitates addition and relocation of stations.

In a further aspect of the invention, an article transport system comprises a carriage including a radio communication unit and a controller, a ground control device including a radio communication unit to communicate data signals with the controller, and a plurality of radio communication relay units distributed over a running range of the carriage; wherein each of the relay units is operable, only when designated in a data signal received, to relay the data signal to a predetermined destination when the data signal is transmitted from the carriage to the control device, and to relay the data signal to a destination designated in the data signal when the data signal is transmitted from the control device to the carriage; the carriage further includes a current position detecting device for detecting a current position within the running range, the controller being operable, in response to detection information provided by the current position detecting device, to determine one of the relay units to be a destination of the data signal and to carry out data communication designating the one of the relay units and including self-identifying information; and the control device is operable to carry out data communication including carriage identifying information and information on an order of signal transfer through the relay units.

With this construction, the data signal transmitted from the carriage and including its own identifying information is received by one of the relay units corresponding to the position of the carriage, and then relayed to a predetermined relay unit or units before reaching the control device on the ground. The data signal transmitted from the control device on the ground is passed to the carriage by radio communication through certain of the relay units in an order determined by the control device.

Since data is transmitted by radio through the relay units, no wiring is required between each relay unit and the control device on the ground. Thus, this article transport system is easy to install. Moreover, this system provides a simplified data transmission mode in that the data signal transmitted from the carriage designates one of the radio relay units corresponding to the position of the carriage. In this article transport system, the data signals are relayed efficiently without any radio interference. If the controller on the carriage transmitted a data signal without designating a receiving relay unit, each of the relay units having received this data signal would relay the signal to the control device on the ground, thereby tending to cause radio interference. Signal processing to avoid such radio interference would complete the construction. The article transport system according to the present invention allows efficient signal communication free of such a drawback.

Each of the relay units may be operable to relay the data signal after adding thereto relay unit identifying information identifying itself when the data signal is transmitted from the carriage to the control device, the control device being operable to determine the information on the order of signal transfer through the relay units based on the relay unit identifying information.

With this construction, data is transmitted to the carriage through the relay units in the order determined from the relay unit identifying information in the data received by the control device on the ground.

The data transmitted to the control device on the ground includes relaying order information on the relay units having relayed this data. The control device on the ground may determine a relaying order for transmitting instructions to the carriage, simply by reversing the above relaying order. Consequently, the article transport system according to the present invention allows data communication with enhanced efficiency.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

An article transport system according to the present invention will be described in detail with reference to the drawings.

Figure 2:
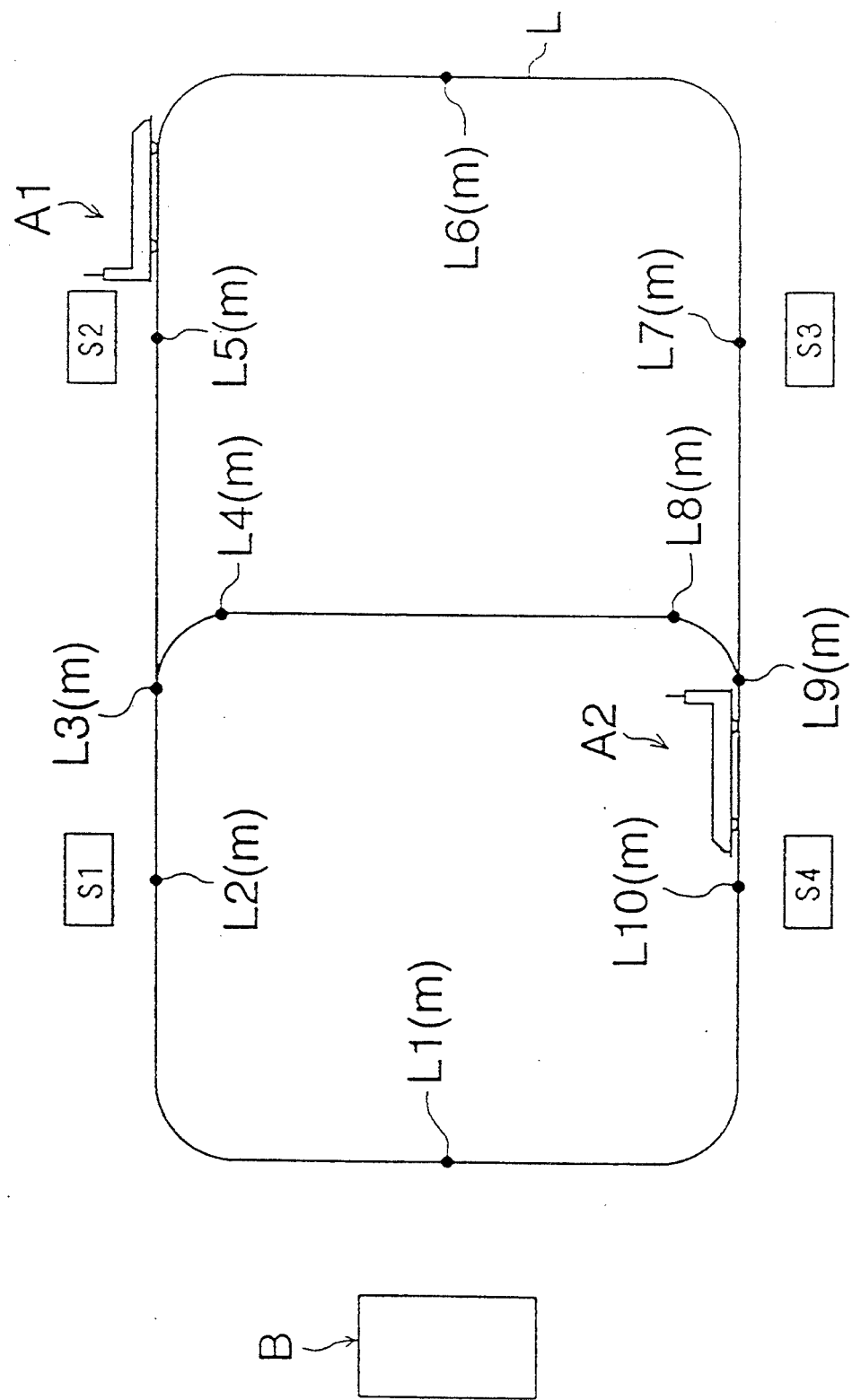
FIG. 2 is a schematic plan view of the article transport system.

As shown in FIG. 2, this system includes carriages A for running along guidelines L defining tracks, a plurality of article loading and unloading stations S, and a base station B. Articles are loaded on or unloaded from the carriages A stopping at the stations S.

Briefly, each guideline L is in the form of light reflecting tape or magnetic tape having a predetermined width. Each carriage A includes a steering control sensor (not shown) to determine whether the carriage A is running properly along the guidelines L. Information from the steering control sensor is used to steer the carriage A.

Figure 1:
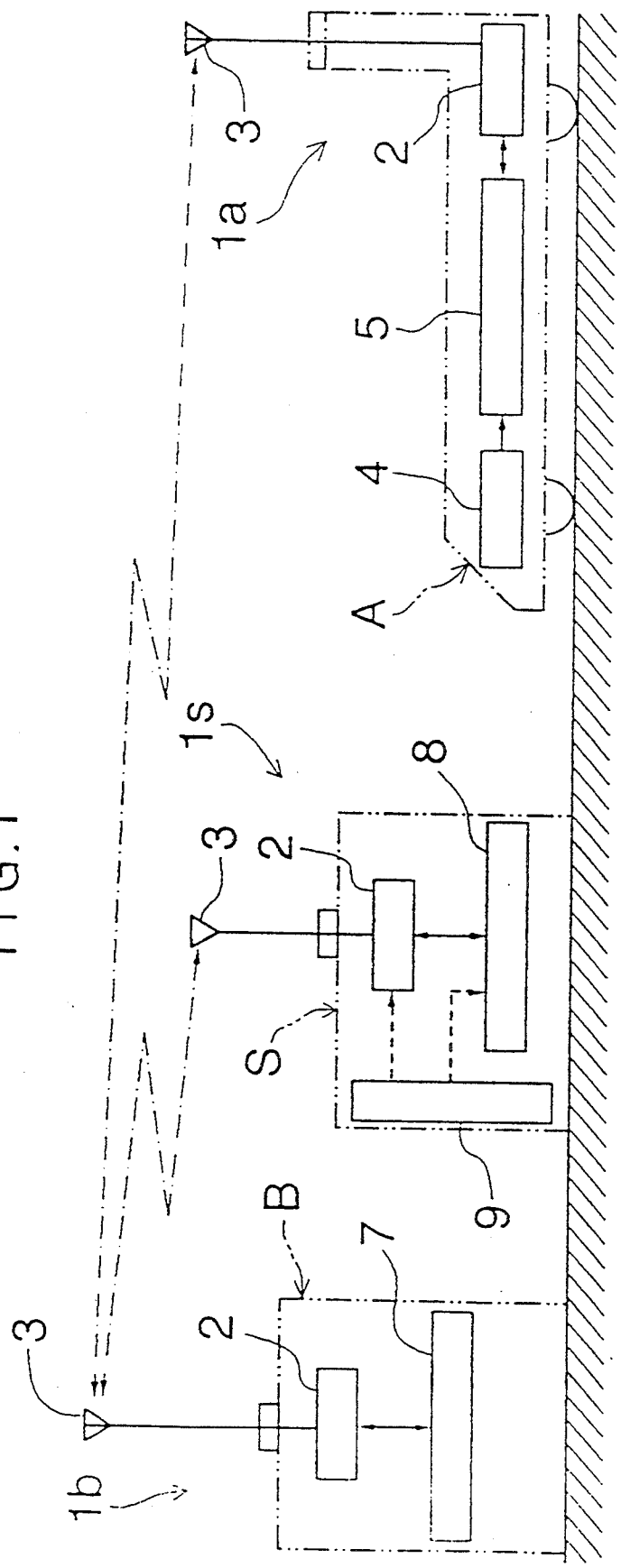
FIG. 1 is a block diagram of an article transport system according to the present invention.

As shown in FIGS. 1 and. 2, each carriage A includes a checkpoint detecting sensor 4 for detecting marks "m" such as code marks or ID cards laid on track surfaces to indicate checkpoints L1–L10 on the guidelines L. Each carriage A further includes a radio communication unit 1a, and a controller 5 for controlling the carriage A.

The base station B includes a controller 7 acting as a managing controller on the ground, and a radio communication unit 1b.

Each station S includes a controller 8 for making article transport requests, a radio communication unit 1s, and a battery 9 for supplying power to the controller 8 and communication unit 1s.

Each of the radio communication units 1a, 1b and 1s includes a modem 2 and an antenna 3 for enabling radio communication. The communication units 1a, 1b and 1s are used to transmit article transport request information from the station S to the managing controller 7 of the base station B, and running instructions from the managing controller 7 to the carriage A.

The above transport system requires no communication wiring or piping between each station S and base station B, and no power lines or piping for supplying power to each station S. This facilitates addition and relocation of stations S.

As shown in FIG. 2, the article transport system in this embodiment includes one base station B, two carriages A and four stations S, with the respective communication units 1a, 1b and 1s to communicate with each other by radio.

In FIG. 2, numerals 1 and 2 are affixed to reference A to identify the carriages A, and numerals 1 to 4 are affixed to reference S to identify the stations S.

An operating sequence of the article transport system will be described next. It is assumed here that an operator requests an article from the station S4 by operating a control panel (not shown) at the station S2.

The carriages A1 and A2 transmit information on current positions thereof to the base station B when the checkpoint sensor 4 detects each of the checkpoints L1–L10. The managing controller 7 of the base station B stores track map information including positions of the stations S and checkpoints L1–L10 on the guidelines L. The managing controller 7 determines between which checkpoints each carriage is, from the current position information received from the carriage A. When, for example, the checkpoint sensor 4 detects the checkpoint L3 and then checkpoint L5, the managing controller 7 determines that the current position of this carriage A is between the checkpoints L5 and L6. When the checkpoint sensor 4 detects the checkpoint L8 and then checkpoint L9, the managing controller 7 determines that the current position of this carriage A is between the checkpoints L9 and L10.

Assuming that an operator operates the control panel at the station S2 to request an article from the station S4, the controller 8 at the station S2 transmits to the base station B information including self-identifying information and article request from the station S4.

Upon receipt of this information, the managing controller 7 at the base station B transmits a signal to the station S4 to check whether the requested article is present at the station S4.

The controller 8 at the station S4 receives this signal, determines whether the article is present or not, and transmits the result to the base station B.

If the article is present at the station S4, the managing controller 7 at the base station B determines which of the carriages A1 and A2 lies closer to the station S4. Then, the managing controller 7 transmits running instructions to the carriage A2 determined to be closer to the station S4.

Based on the running instructions, the controller 5 of the carriage A2 causes the carriage A2 to run to the station S4, and to run to the station S2 after receiving the article from the station S4. The article is unloaded at the station S2.

In the above radio communication, the transmitting party transmits a signal including the self-identification thereof and the identification of a receiving party. The receiving party disregards the signal if the identification indicates a different receiving party.

Another embodiment will be described next.

Figure 4:
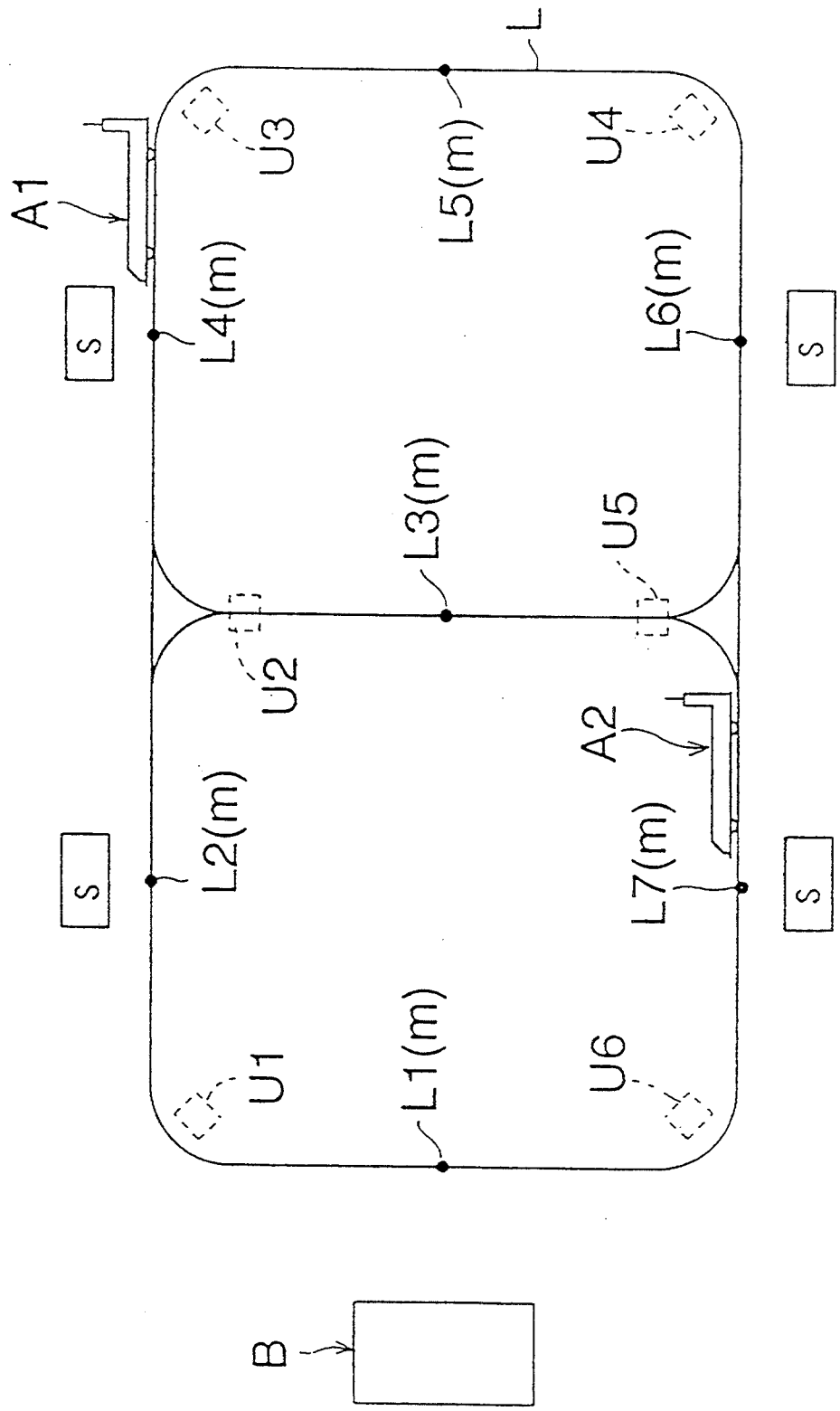
FIG. 4 is a schematic plan view of the article transport system shown in FIG. 3.

As shown in FIG. 4, guidelines L are laid on the ground to define running tracks of carriages A. A plurality of article loading and unloading stations S are arranged along the guidelines L. Each guideline L is in the form of light reflecting tape or magnetic tape having a predetermined width. Each carriage A includes a steering control sensor (not shown) to determine whether the carriage A is running properly along the guidelines L. Information from the steering control sensor is used to steer the carriage A.

This system includes one base station B, two carriages A and six relay units U. The base station B and carriages A communicate with each other through respective communication units provided therefor and connected to a radio communication circuit.

In FIG. 4, numerals 1 and 2 are affixed to reference A to identify the carriages A, and numerals 1 to 6 are affixed to reference U to identify the relay units U.

The six relay units U are arranged in a ceiling area over a running range of the carriages A, and distributed as shown in FIG. 4.

Figure 3:
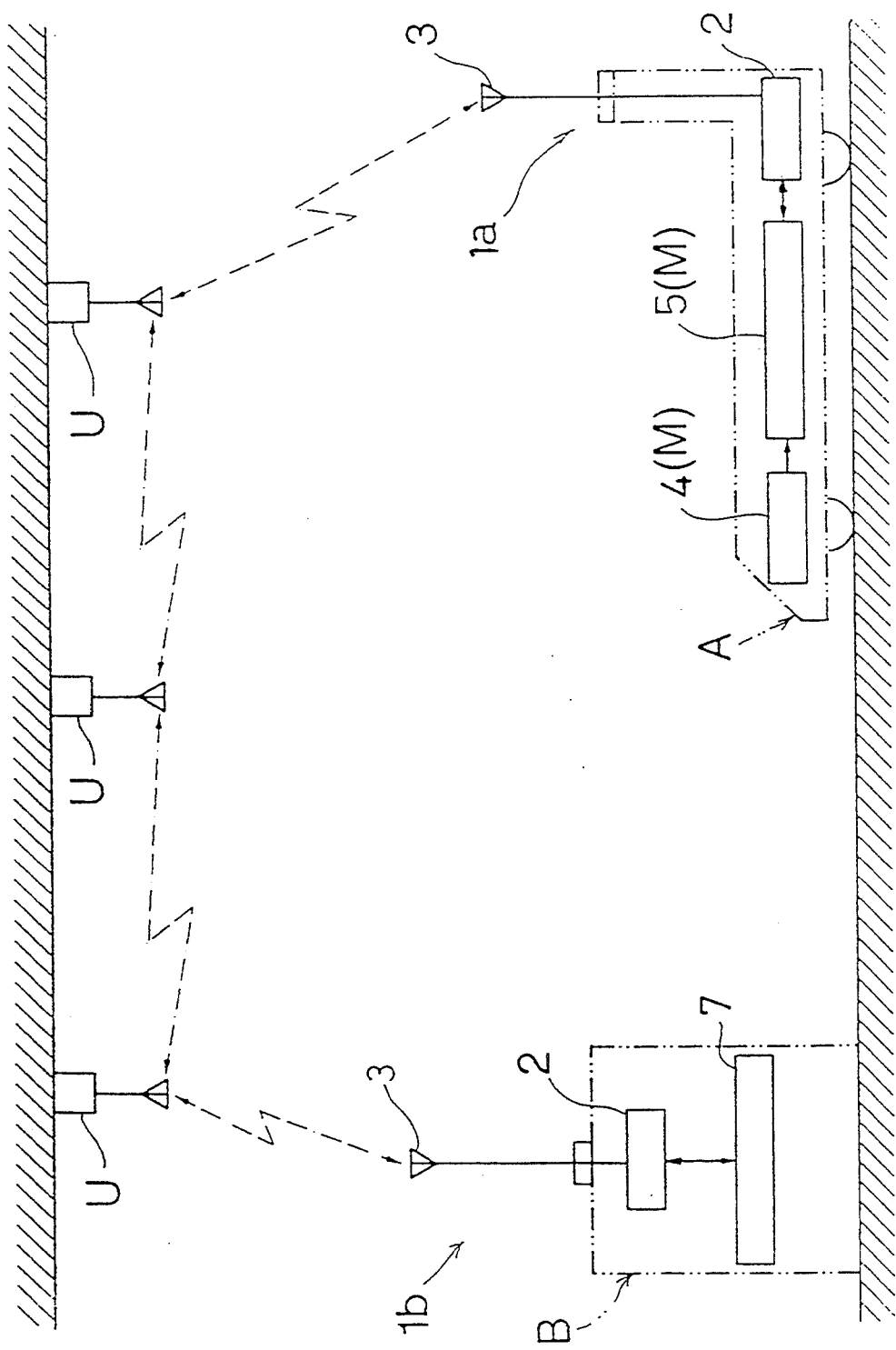
FIG. 3 is a block diagram of an article transport system in another embodiment of the invention.

As shown in FIGS. 3 and 4, each carriage A includes a checkpoint detecting sensor 4 for detecting marks "m" such as code marks or ID cards laid on track surfaces to indicate checkpoints L1–L7 on the guidelines L. Each carriage A further includes a radio communication unit 1a, and a controller 5 for controlling the carriage A. The base station B includes a controller 7 acting as a managing controller on the ground, and a radio communication unit 1b. Each relay unit U includes a radio communication unit and a signal processing controller (not shown). Each of the radio communication units 1a and 1b and the relaying communication units includes a modem 2 and an antenna 3 for enabling radio communication.

In the above transport system, the controllers 5 of the carriages A and managing controller 7 on the ground communicate with each other through the plurality of relay units U.

A current position detecting device M for detecting a current position of each carriage A on the guidelines L will be described next with reference to FIG. 4.

The controller 5 of each carriage A stores track map information including positions of the stations S and checkpoints L1–L7 on the guidelines L. The controller 5 determines between which checkpoints each carriage is, from detection information provided by the checkpoint sensor 4. When, for example, the checkpoint sensor 4 detects the checkpoint L5 and then checkpoint L4, the controller 5 determines that the current position of this carriage A is between the checkpoints L2/L3 and L4. When the checkpoint sensor 4 detects the checkpoint L4 and then checkpoint L5, the controller 5 determines that the current position of this carriage A is between the checkpoints L5 and L6.

Thus, the controller 5 and checkpoint sensor 4 act as the current position detecting device M.

The way in which the carriages A and base station B communicate with each other will be described next with reference to FIG. 4.

In this transport system, communication begins with an operation request made from one of the carriages A to the base station B for transmission of information. In response to the operation request, the base station B provides the carriage A with operating instructions.

The controller 5 of the carriage A transmits data including self-identifying information, and designation of a relay unit determined from the position of the carriage A on the guidelines L detected by the current position detecting device M. The controller 5 designates the relay unit U1 when the carriage A is between the checkpoints L1 and L2, the relay unit U2 when the carriage A is between the checkpoints L2, L3 and L4, the relay unit U3 when the carriage A is between the checkpoints L4 and L5, the relay unit U4 when the carriage A is between the checkpoints L5 and L6, the relay unit U5 when the carriage A is between the checkpoints L3, L6 and L7, and the relay unit U6 when the carriage A is between the checkpoints L1 and L7.

In communication with the base station B, each relay unit U is operable, only when this relay unit U is designated to be the data receiving party, to transmit data with designation of a predetermined next data receiving party. That is, in communication with the base station B, the respective relay units U transmit data in the following directions:

From relay unit U 1 to base station B;
From relay unit U2 to relay unit U1;
From relay unit U3 to relay unit U2;
From relay unit U4 to relay unit U5;
From relay unit U5 to relay unit U6; and
From relay unit U6 to base station B.

In the above case, each relay unit U transmits a data signal with relay unit identifying information identifying itself added to the data received.

In communication with the carriages A, each relay unit U transmits data received to the next receiving party designated by the managing controller 7.

Based on the relay unit identifying information included in the data received, the managing controller 7 determines an order of the relay units U through which data is passed. That is, data is transmitted to one of the carriages A through the relay units U in the order reversed from the order in which the data was relayed to the base station B.

Thus, as shown in FIG. 4, when the carriage A1 is between checkpoints L4 and L5, the carriage A1 transmits data to the base station B by way of the relay unit U3, relay unit U2 and relay unit U1. The carriage A2 transmits data to the base station B by way of the relay unit U5 and relay unit U6.

The base station B transmits data to the carriages A1 and A2 in the orders reversed from the above.

A data signal format used in this transport system will be described next.

Figure 5:
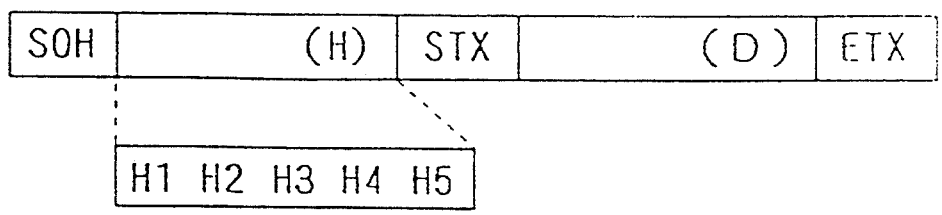
FIG. 5 is an explanatory view of a data signal used in the embodiment shown in FIG. 3.

As shown in FIG. 5, a data signal includes a start of header SOH, a header H, a start of text STX, data D and an end of text ETX allotted in the stated order. The start of header SOH is provided for allowing detection of the beginning of header H, and the end of text ETX marks the end of data D.

The header H includes a next data receiver's address H1, a command H2, a final data receiver's address H3, a data sender's address H4, and communication path data H5.

The next data receiver's address H1 is renewed with each transfer of the data signal. The communication path data H5 shows a path through which the data has been or should be communicated. When a data signal is transmitted from one of the carriages A to the base station B, the addresses of relay units U through which the signal has been passed are written in the order of transfer. When a signal is transmitted from the base station B to one of the carriages A, the address of base station B, the addresses of relay units U through which the signal is transferred, and the address of the receiving carriage A are written in the order of transfer.

Figure 6:
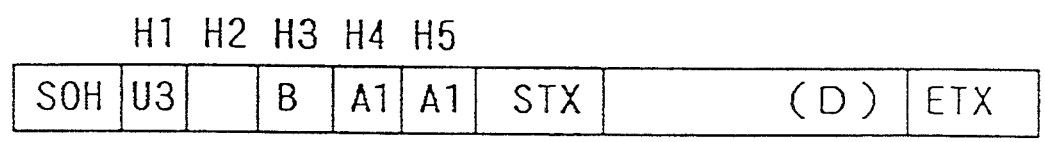
FIG. 6 is an explanatory view of a data signal used in the embodiment shown in FIG. 3.

When a data signal is transmitted from the carriage A1 to the base station B, for example, this data signal, as shown in FIG. 6, has the next receiver's address H1 showing the address of relay unit U3 corresponding to the position of the carriage A1, and the final data receiver's address H3 showing the address of base station B. The sender's address H4 shows the address of carriage A1, and the communication path data H5 shows the address of carriage A1 as the sender's address.

Figure 7:
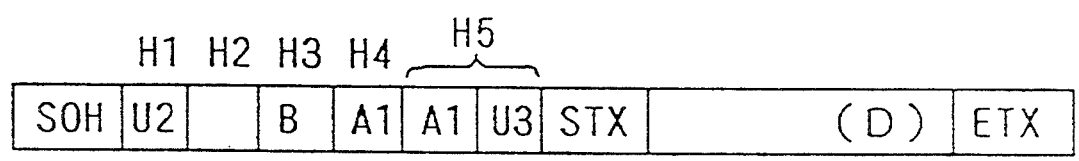
FIG. 7 is an explanatory view of a data signal used in the embodiment shown in FIG. 3.
Figure 8:
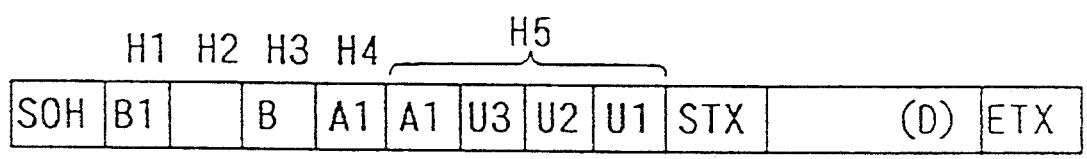
FIG. 8 is an explanatory view of a data signal used in the embodiment shown in FIG. 3.

The data signal transmitted from the carriage A1 is received by the relay units U2–U4 lying in the reception range, where the header is analyzed and the next data receiver's address H1 is compared with the addresses of the respective relay units U2–U4. Then, the data signal is relayed by the relay unit U3 whose address agrees with the next data receiver's address H1. The other relay units U2 and U4 disregard the signal. When the signal is transferred, the address of the next relay unit U2 is determined as above with reference to the final data receiver B written in the address H3. As shown in FIG. 7, the next data receiver's address H1 is rewritten to be the address of relay unit U2, and the address U3 is added to the communication path data H5. In this way, the data signal transmitted from the carriage A1 is passed to the base station B through the relay units U3, U2 and U1. FIG. 8 shows the data signal as received by the base station B. The data D in FIGS. 6 through 8 shows information regarding the current position, results of operation, moving state or stopping state of the carriage A1.

Figure 9:
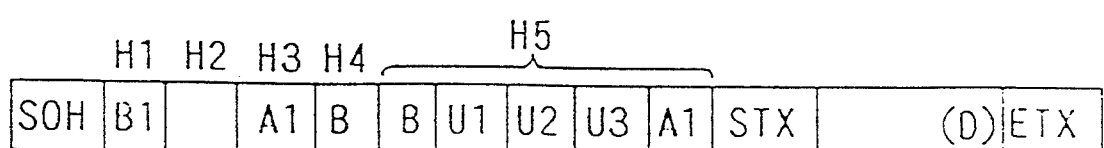
FIG. 9 is an explanatory view of a data signal used in the embodiment shown in FIG. 3.

Based on the data received, the managing controller 7 at the base station B transmits a data signal as shown in FIG. 9 to the carriage A1. This signal includes data H5 showing the address of base station B and the reversed communication path, and the next data receiver's address H1 showing the relay unit U1 determined from the data H5, the final data receiver's address H3 showing the carriage A1, and the sender's address H4 showing the address of base station B.

The data signal transmitted from the base station B is received by the relay units U1 and U6 in the reception range, where the header is analyzed. The data signal is relayed by the relay unit U1 whose address agrees with the next data receiver's address H1. The relaying order is determined from the communication path data H5, and the signal is passed through the relay units U1, U2 and U3 to the carriage A1.

In the absence of an operation request transmitted from the carriages A to the base station B, the base station B may initiate communication as follows.

When the current position of the relevant carriage A is known, a data signal is transmitted to the carriage A by way of relay units U in an order predetermined with respect to that position.

When the current position of the relevant carriage A is unknown, a data signal is transmitted to all the relay units U in a predetermined order, and the relay units U relay the signal to the carriage A.

In the above embodiment, the carriages A are caused to run along the guidelines L in the form of light reflecting tape or magnetic tape laid on the ground. A current position of each cartage A is detected based on detection of checkpoints L1–L7 which are also in the form of light reflecting tape or magnetic tape. In place of the guidelines L and checkpoints L1–L7 laid on the ground, each carriage A may include a moving direction detecting device such as a gyroscope, and a moving distance detecting device for detecting a moving distance of the carriage A. Detection information provided by these devices may be used to determine the current position of the carriage A and to run the carriage A following a predetermined course.

In the above embodiment, the order of relay units U relaying data transmitted from the base station B to one of the carriages A is derived from the communication path data H5 in the signal received by the base station B. However, this order may be determined from information on the current position of the carriage A included in the data D of the signal received.

In the above embodiment, each of the carriages A, base station B and relay units U communicates by means of the communication unit covering its own area. This communication system may be made a dual system in which a plurality of modems 2 share the same communication area. Then, in the event of breakdown of one communication unit including a modem 2 and an antenna 3, the remaining communication unit may continue communication within the same area.

Each carriage A in the above embodiment designates a relay unit U corresponding to the current position of the carriage A when transmitting a data signal. If the carriage A fails to receive instructions from the base station B, the carriage A may decide that one of the relay units U is out of order, and redirect the data signal to a different relay unit U. This allows a continued communication through other relay units U when one relay unit U is out of order. For example, when the carriage A1 transmits a data signal from the position shown in FIG. 4 to the relay unit U3 which is the first relay unit in the order of data transfer, but no instructions are received from the base station B, the carriage A1 decides that one of the relay units U1–U2 in the communication path is out of order, and retransmits the signal to the relay unit U4.

Various other modifications may be made to the specific constructions of the carriages A and guidelines L and to those of other components necessary in working the present invention.

What is claimed is:

1. An article transport system comprising:
    a plurality of article loading and unloading stations, wherein each said station includes a controller for making article transport requests;
    a plurality of checkpoints disposed at predetermined positions between said stations;
    a carriage for running between said stations, wherein said carriage includes a controller and a checkpoint detecting sensor for detecting said checkpoints; and
    ground control means for instructing said carriage to run between said stations to transport an article therebetween at an article transport request received from one of said stations;

wherein each of said control means, said stations and said carriage includes a radio communication unit, said one of said stations transmitting the article transport request to said control means, and said control means instructing said carriage to run, by radio communication and wherein said control means stores track map information including positions of said stations and said checkpoints, said control means determining between which checkpoint said carriage is located from current position information received from said carriage.

2. An article transport system as defined in claim 1, wherein said carriage is driven along a running line laid on a running surface, said carriage including a steering control sensor to determine whether said carriage is running properly along said running line.

3. An article transport system as defined in claim 2, wherein said running line is in form of light reflecting tape or magnetic tape having a predetermined width.

4. An article transport system as claimed in claim 2, wherein said checkpoints are disposed on said running line.

5. An article transport system comprising:
a plurality of article loading and unloading stations;
a carriage for running between said stations, said carriage including a radio communication unit and a controller;
ground control means including a radio communication unit to communicate data signals with said controller of said carriage; and
a plurality of radio communication relay units distributed over a running range of said carriage;
wherein each of said relay units is operable, only when designated in a data signal received, to relay the data signal to a predetermined destination when the data signal is transmitted from said carriage to said control means, and to relay the data signal to a destination designated in the data signal when the data signal is transmitted from said control means to said carriage;
said carriage includes current position detecting means for detecting a current position within said running range, said controller being operable, in response to detection information provided by said current position detecting means, to determine one of said relay units to be a destination of the data signal and to carry out data communication designating said one of said relay units and including self-identifying information; and
said control means is operable to carry out data communication including carriage identifying information and information on an order of signal transfer through said relay units.

6. An article transport system as defined in claim 5, wherein said carriage is driven along a running line laid on a running surface, said carriage further including a steering control sensor to determine whether said carriage is running properly along said running line, and a checkpoint detecting sensor for detecting marks laid on track surfaces to indicate checkpoints on said running line.

7. An article transport system as defined in claim 6, wherein said running line is in form of light reflecting tape or magnetic tape having a predetermined width.

8. An article transport system as defined in claim 5, wherein each of said relay units is operable to relay the data signal after adding thereto relay unit identifying information identifying itself when the data signal is transmitted from said carriage to said control means, said control means being operable to determine the information on the order of signal transfer through said relay units based on said relay unit identifying information.

9. An article transport system comprising:
a plurality of article loading and unloading stations;
a carriage for running between said stations, wherein said carriage is driven along a running line laid on a running surface, said carriage including a steering control sensor to determine whether said carriage is running properly along said running line, a checkpoint detecting sensor for detecting marks laid on said running line to indicate checkpoints, and a controller for controlling said carriage; and
ground control means for instructing said carriage to run between said stations to transport an article therebetween at an article transport request received from one of said stations,
wherein each of said control means, said stations and said carriage includes a radio communication unit, said one of said stations transmitting the article transport request to said control means, and said control means instructing said carriage to run, by radio communication.

10. An article transport system as claimed in claim 9, wherein said running line is in the form of at least one of a light reflecting tape and a magnetic tape having a predetermined width.

11. An article transport system as claimed in claim 9, wherein said control means stores track map information including positions of said stations and said checkpoints on said running line, said control means determining between which checkpoints said carriage is located from current position information received from said carriage.

* * * * *